(No Model.)
A. HUSSEY.
CUTTING TOOL.
No. 528,725. Patented Nov. 6, 1894.
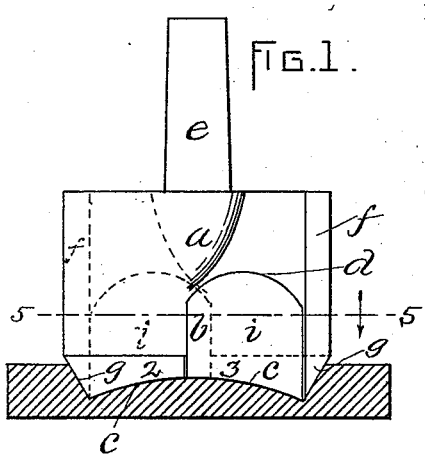
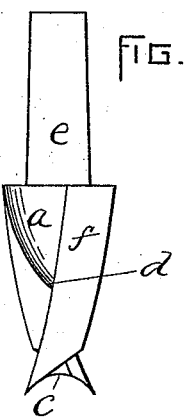
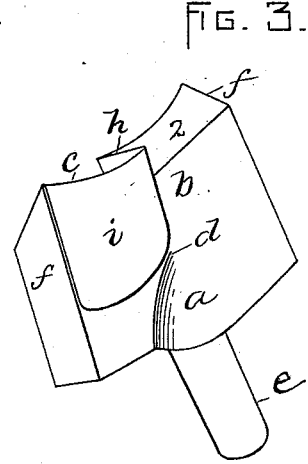
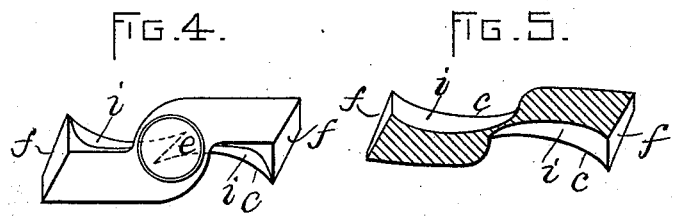
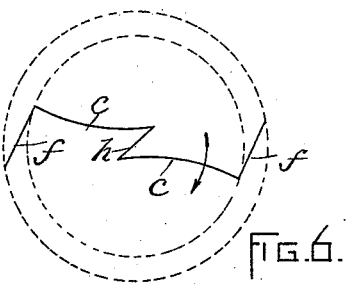
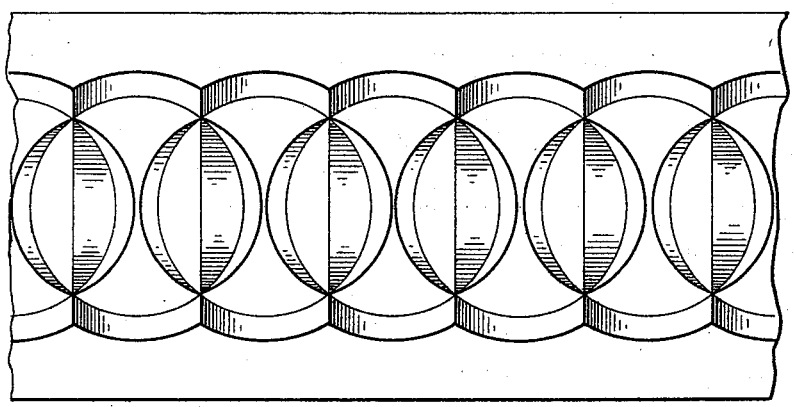
WITNESSES
A. D. Hanson
W. F. McLeod
INVENTOR:
A. Hussey
by
Wright, Brown & Crosby

UNITED STATES PATENT OFFICE.

ALBERTUS HUSSEY, OF MILFORD, ASSIGNOR OF ONE-HALF TO O. ATHERTON SHEPARD, OF BROOKLINE, MASSACHUSETTS.

CUTTING-TOOL.

SPECIFICATION forming part of Letters Patent No. 528,725, dated November 6, 1894.

Application filed January 15, 1894. Serial No. 496,907. (No model.)

*To all whom it may concern:*

Be it known that I, ALBERTUS HUSSEY, of Milford, in the county of Worcester and State of Massachusetts, have invented certain new and useful Improvements in Cutting-Tools, of which the following is a specification.

This invention has relation to rotary cutting tools for wood-working, and has for its object, first, the provision of a cutting tool in which the cutting edge shall at no point be a radius or any part of a radii of the circle made by its revolution, so that said cutting edge may always operate as with a draw-cut, and not operate with a scraping action; second, the provision of a cutting tool in which the pattern to be made by the tool may be formed axially in its sides so that the tool may be ground on a bevel on the side opposite to that in which the pattern is formed, and the tool employed until its efficient length is used up from wear and re-sharpening by grinding, without changing the pattern by use; third, the provision of other improvements incidental to the foregoing, all as will hereinafter more fully appear.

To these ends the invention consists of the improvements which I will now proceed to describe and claim.

Reference is to be had to the annexed drawings and to the letters and figures marked thereon forming a part of this specification, the same letters and figures designating the same parts or features as the case may be, wherever they occur.

Of the drawings, Figure 1 is a front view of the improved cutting tool with a sectional view of a strip of molding on which it is shown as operating. Fig. 2 is an edge view of the improved tool. Fig. 3 is a perspective view of the same. Fig. 4 is a plan view of the same. Fig. 5 is a sectional view taken on the line 5 5 of Fig. 1. Fig. 6 is a diagram designed to show the form of the cutting edge in plan view. Fig. 7 is a plan view of a strip of molding which may be formed by the tool. Fig. 8 is a sectional view of a strip of molding which may be formed by a slightly modified form of cutter.

In the drawings—$a$ designates the body of the improved cutter and $b$ is the efficient blade portion, extending from the cutting edges $c\ c$ to the base $d$ of the body.

$e$ is the shank of the tool which may be made to fit any chuck like an auger, or of tapering form to fit any socket round, square or spiral shaped, or may have a socket formed in the body of the tool to fit any shank or spindle.

The blades 2 3 proper of the blade portion $b$ are formed on an incline, slightly curved with respect to the axis of the tool, so that the action of the cutting edges may be inclined with respect to the grain of the wood when the axis of rotation is parallel therewith or at right angles thereto, as, in use, it generally will be. The blades at their outer edges may be beveled axially with the tool, as at $ff$, so as to afford inclined cutting edges $g\ g$.

The body portions $c\ c$ of the cutting edges will overlap at their inner ends, extending as they do beyond but outside of the axis of the tool, and are joined by a diagonal cutting web $h$, as is clearly shown in Figs. 3, 4 and 6.

To form the pattern for the molding or other article to be cut, the blades 2 3 are milled out, the one on the opposite side from the other as at $i\ i$, in conformity with such pattern for the full length of said blade on a line with the axis of the cutting tool. With this construction I am enabled to sharpen the blades by a single grinding of each on a single bevel on the side opposite to that milled out to form the pattern, and use the tool until the blades are worn out up to the body.

Fig. 7 shows the pattern of a molding formed from a tool constructed as shown in Figs. 1 to 6, inclusive; said molding being formed by rotating the tool against the face of the strip to form a recess of the desired depth, then moving the tool or the strip along the distance of one-half the circle described by the tool and again forming a recess, and so on, and Fig. 8 in cross-section shows a piece of molding which may be cut by a tool having a modified form of molding milled out thereon. These two views of a molding serve but to illustrate the almost infinite variety of patterns that may be made by a variation in the form of the millings $i$.

It will be noted that no part of the cutting edges of the blades is a radius of the circle made by the revolution of the tool, which, with the inclination of the blades before mentioned, insures a substantial draw-cut and avoids a scraping action, thus securing a smooth shaving of the wood. By molding the cutter so as to raise or depress the center, it will be understood that the draw-cutting or shaving action of the blades will be correspondingly increased.

By overlapping the cutting edges at the center and joining the same by the diagonal or inclined cutting web $h$, the center of the cut made by the tool is fully covered so that the center of the pattern is clean of center or other marks.

The center web $h$ cuts both ways, avoiding any drag or rubbing, and covers perfectly the center of rotation in addition to its being covered by the overlapping cutting edges of the blades.

The fact that each blade can be ground on a single bevel, and preserve intact the pattern for the molding is an important feature of the invention.

Having thus explained the nature of the invention and described a way of constructing and using the same, though without attempting to set forth all of the forms in which it may be made or all of the modes of its use, it is declared that what is claimed is—

1. A cutting-tool comprising in its construction blades provided with curved cutting edges overlapping at their inner ends, and every part of which is a tangent of the circle made by their revolution, as set forth.

2. A cutting-tool comprising in its construction blades provided with cutting edges overlapping at their inner ends and extending outside the center, and a diagonal web connecting the inner ends of the cutting edges, as set forth.

3. A cutting-tool comprising in its construction curved blades inclined in opposite directions with respect to the axis of the tool and lapping past each other, and a milled pattern formed in one side of each blade in line with the said axis, as set forth.

4. A cutting-tool comprising in its construction blades having longitudinally beveled edges, said blades being inclined in opposite directions with respect to the axis of rotation of the tool, a milled pattern formed in one side of each blade and a single bevel on the horizontal edge of each blade to form the cutting edge thereon, as set forth.

In testimony whereof I have signed my name to this specification, in the presence of two subscribing witnesses, this 2d day of January, A. D. 1894.

ALBERTUS HUSSEY.

Witnesses:
C. P. TURNER,
ROBERT C. HUSSEY.